(12) United States Patent
Lang et al.

(10) Patent No.: US 7,355,629 B2
(45) Date of Patent: Apr. 8, 2008

(54) INTERNALLY MOUNTED, MOVABLE CAMERA FOR VEHICLES

(75) Inventors: Heinrich Lang, Ergersheim (DE); Jaap-Jan Snel, Ergersheim (DE); Jörg Scholler, Ergersheim (DE); Michael Witzke, Anshach (DE)

(73) Assignee: Lang Mekra North America, LLC, Ridgeway, SC (US)

( * ) Notice: Subject to any disclaimer, the term of this patent is extended or adjusted under 35 U.S.C. 154(b) by 837 days.

(21) Appl. No.: 10/628,862

(22) Filed: Jul. 28, 2003

(65) Prior Publication Data

US 2004/0130622 A1    Jul. 8, 2004

(30) Foreign Application Priority Data

Jul. 29, 2002   (DE) ................ 102 34 483

(51) Int. Cl.
*H04N 7/18* (2006.01)

(52) U.S. Cl. ...................... 348/148; 348/151

(58) Field of Classification Search ........ 348/143–170; 296/180.1; 280/727; *H04N 7/18*
See application file for complete search history.

(56) References Cited

U.S. PATENT DOCUMENTS

| 3,689,695 A | | 9/1972 | Rosenfield et al. |
|---|---|---|---|
| 4,277,804 A | * | 7/1981 | Robison .............. 348/148 |
| 5,375,903 A | * | 12/1994 | Lechner ............... 296/180.1 |
| 2002/0113415 A1 | * | 8/2002 | Pochmuller ........... 280/727 |

FOREIGN PATENT DOCUMENTS

| DE | 37 26663 A1 | 2/1989 |
|---|---|---|
| DE | 41 34 886 A1 | 8/1993 |
| DE | 200 17 064 U1 | 1/2001 |
| DE | 100 13 425 A1 | 9/2001 |
| JP | 57076578 | 11/1983 |
| JP | 02065840 | 11/1991 |
| JP | 04150555 | 12/1993 |
| JP | 06294457 | 6/1996 |
| JP | 09202373 | 2/1999 |
| JP | 11234953 | 3/2001 |

\* cited by examiner

*Primary Examiner*—Anand Rao
(74) *Attorney, Agent, or Firm*—McNair Law Firm, P.A.

(57) ABSTRACT

A camera assembly for a commercial vehicle with a cargo compartment, which comprises a camera, and a movement apparatus, wherein the movement apparatus displaces the camera, at least partially outward, from the interior of the cargo container, in such a manner, that the camera, by an energized movement apparatus can survey a definite field of view in the rearward area of the commercial vehicle. The movement of the camera may be through an opening in the rear closure of the cargo container. In this way, it becomes possible, even with a downward, closed, rear to observe the area lying behind the commercial vehicle by means of the camera during the backing up of the commercial vehicle.

11 Claims, 3 Drawing Sheets

Figure 1:
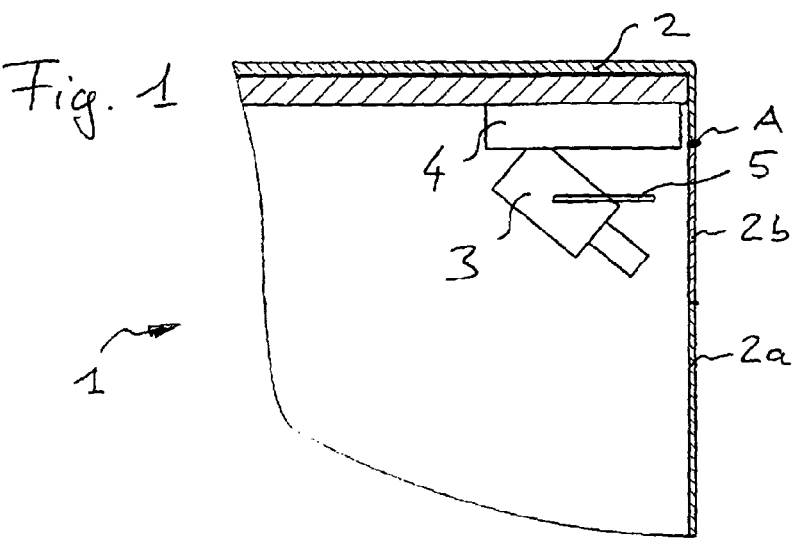

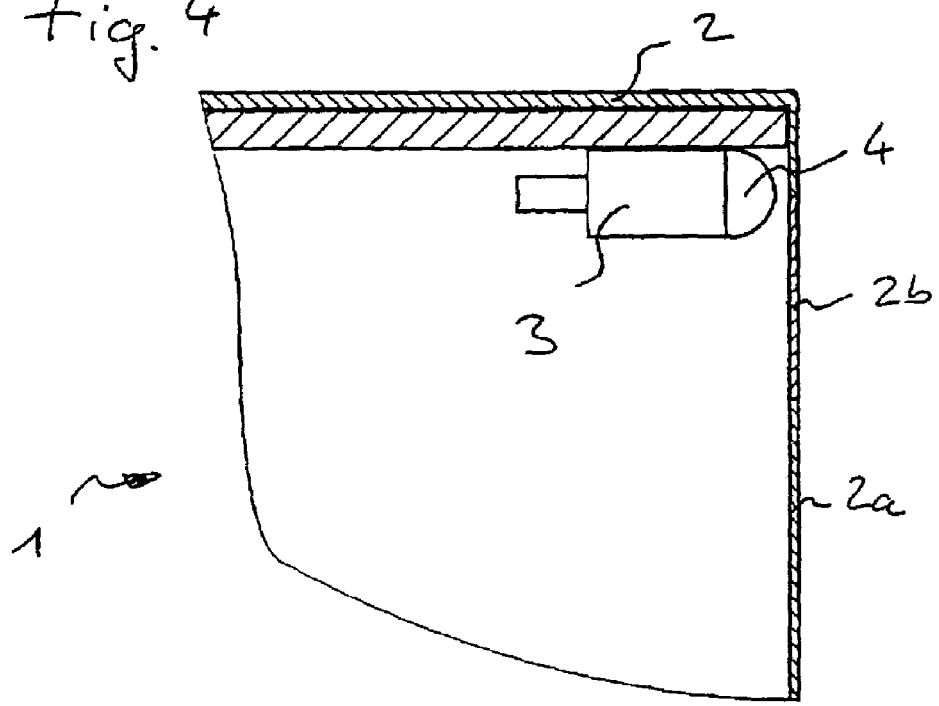
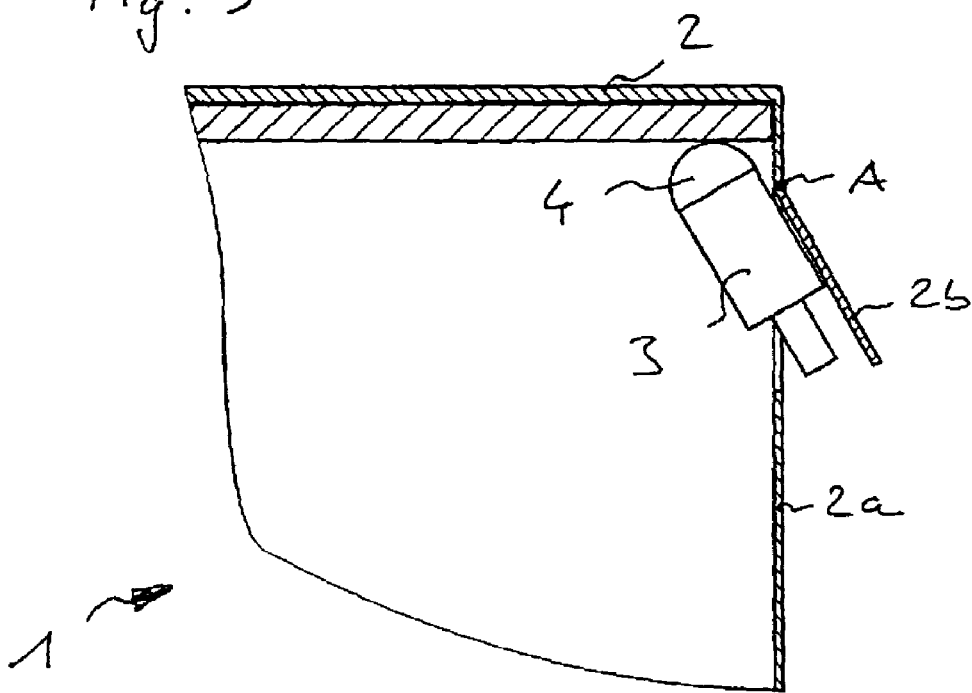

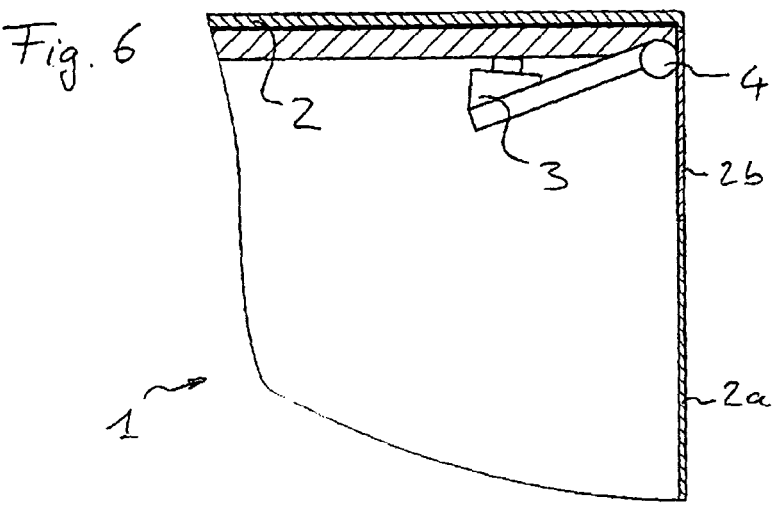
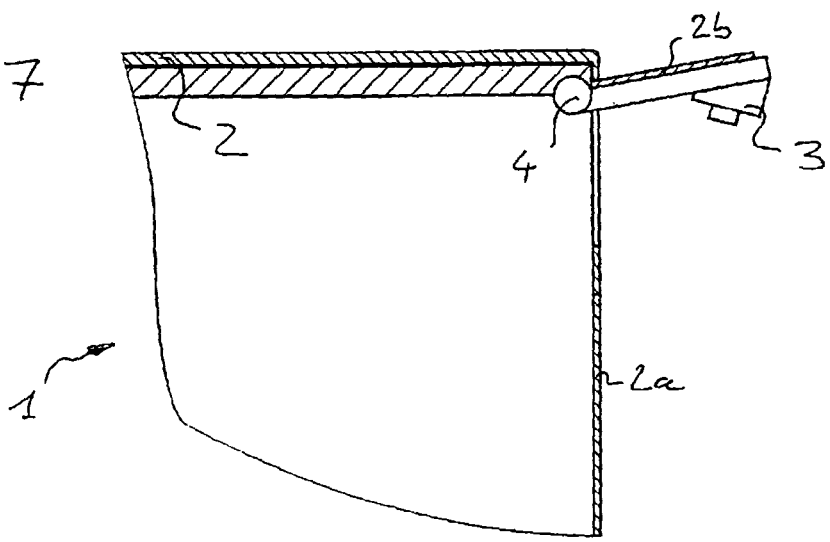
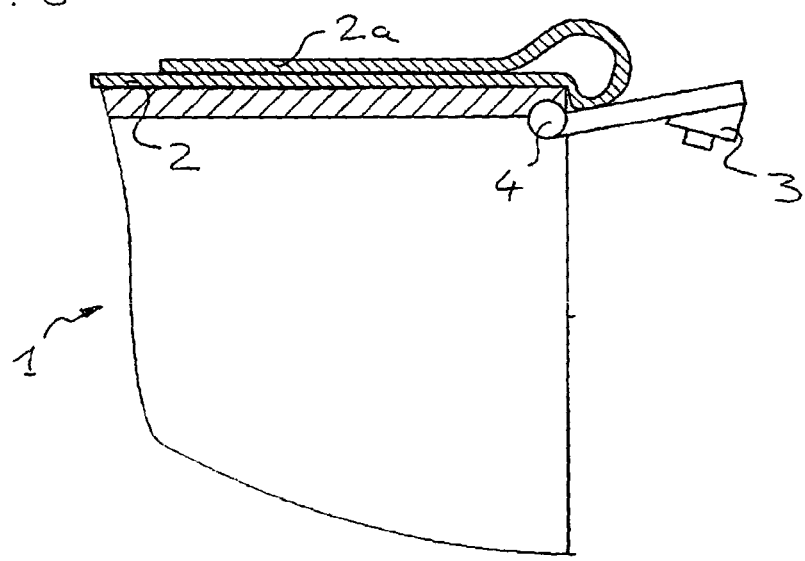

INTERNALLY MOUNTED, MOVABLE CAMERA FOR VEHICLES

The present invention is directed to a movable camera for the cargo compartment of a commercial vehicle, particularly a tarpaulin covered compartment, mounted either singly or on a trailer.

During travel in reverse, the problem which universally presents itself is during the required twisting around of the driver, and the limited field of view through obstructing door posts, head rests and the like. This problem especially occurs in the case of commercial vehicles, since the rear construction of the same, including cargo container structure, vehicle crane or other appurtenances, can completely shut off the line of sight to the rear. At the same time, in the case of such vehicles, often a very precise reverse driving is necessary with much attention given to the surrounding situation in the rear. This is especially true in backing up to a loading ramp or making entry into a bus garage with narrow clearance.

The solution provided by mirrors to this problem is only partial, since their outside dimensions and positions, relative to the driver cause it to be impossible to view the entire rear area. This problem is exacerbated in the case of multiple unit vehicles, such as tow trucks and tractor-trailers, because in accordance with the positioning of each articulated unit, it is fully impossible to view the obscured area behind the last towed unit.

For the solution to this problem, it is a known practice, to install one or more cameras externally on the vehicle, in such a manner, that they can survey the obscured area behind the vehicle. The image taken by the camera, is then transmitted for the view of the driver to a monitor in the vehicle cab or to a partitioned picture on a part of the rear view mirror. This has the advantage, that the driver need not remove his attention from the area which lies in front of the vehicle.

The camera is, as a rule, securely mounted on the rear, upper edge of the cargo container, so that the obscured, rearward area behind the vehicle and the surroundings thereof can imaged. The disadvantage of this is, that even when the camera is not in use, as in the case during normal forward travel, for instance on an expressway, the camera is subjected to external conditions, such as wind from speed of travel. This exposure, first, makes it necessary to provide a camera with complex sealing and mounting means, and second, the increased air resistance due to the camera increase the gasoline consumption of the commercial vehicle.

In the case of commercial vehicles, internal installation presents additionally the following difficulty. If the camera, in accord with the above description, is on the rear, upper end of the cargo compartment and on the outside thereof and if a back end tarpaulin is thrown over onto the roof, in order to make the loading gate more accessible, then this camera is covered and the driver has the above mentioned problems of backing up to contend with. If, conversely, the camera is on the rear, upper end of the cargo compartment on the inside of the cargo compartment, then the camera is again blocked by the tarpaulin. The installation of two cameras, one inside and one outside, is too expensive.

Thus the purpose of the invention is to make available a camera for the observation of the rear section of the commercial vehicle, which, when it is not necessarily in use, is not exposed to the outside conditions and presents no air resistance.

A further purpose of the invention is, that either in the case of a rear tarpaulin being thrown back over the container top or being dropped down, a view of the rear area of the vehicle is made possible.

Another object of the invention is a cargo compartment which possesses in its rear side, an opening, preferably a movable back-end flap, or a slot, which can be opened, to provide the desired field of vision. Thus, in case of a back tarpaulin being thrown over the roof of a cargo compartment, the line of sight is still open.

This opening, in accord with the invention, is made open by means of a movement apparatus, which can include a linear and/or a rotary drive mechanism. A corresponding positioned camera, can then survey the rear area of interest behind the commercial vehicle, or its trailer(s), and for instance, transmit the image thereof into a monitor in the driver's cab or into a rearview mirror.

In a preferred version, the camera is movable, so that it, for example, can be brought into a position during reverse vehicle movement, from which the area of interest is optimally visible. At other times, the camera can be covered in the inside of the cargo container, and thus protected from damage or accumulation of direct. Advantageously, the opening is opened during the movement of the camera, in that, to a certain extent, the camera is partially moved to the rear by its movement apparatus in the longitudinal direction of the vehicle. In this way, the camera would be pushed through a corresponding slot in the tarpaulin end of the container, or a corresponding rear flap would be caused to open.

Advantageously, the invented camera construction can be placed at least in the last unit of a tractor trailer arrangement with multi-trailers, or also in a single commercial vehicle with an integral cargo container. For instance, for safety considerations, this would allow a view of the area lying behind the commercial vehicle as well as permit exact backing-up onto a loading ramp which is behind the last trailer of the articulated vehicle assembly.

Further features, advantages and embodiments become evident in the subordinate claims and from the following more closely described embodiments, with the aid of the drawings.

Figure 2:
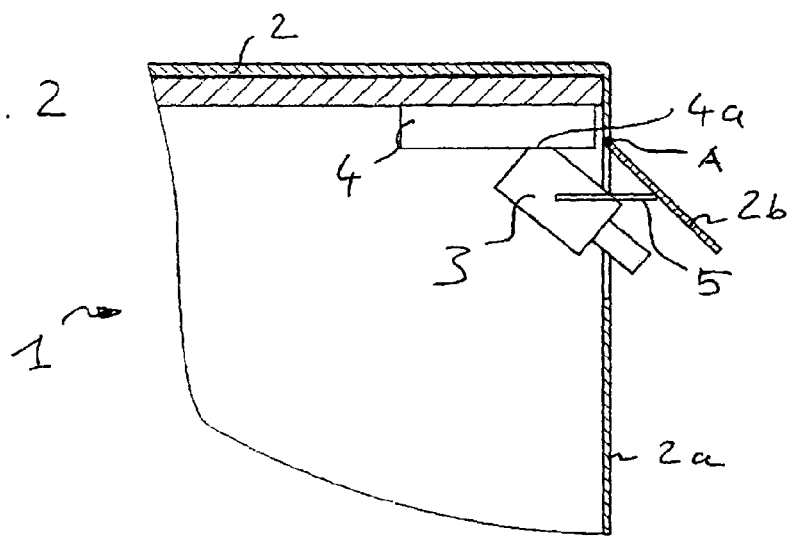
Figure 3:
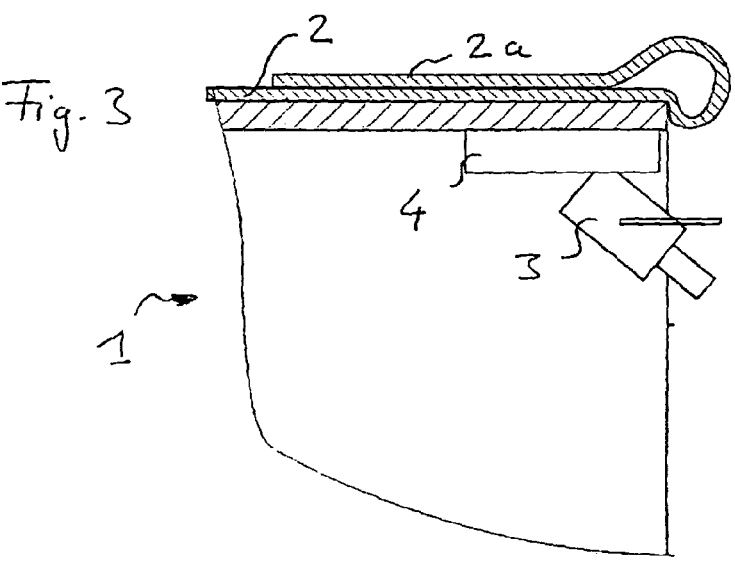

There is shown in:

FIG. 1 a partial section of the rear part of a truck in normal operation with a tarpaulin cargo container and a camera in accord with a first embodiment of the present invention, FIG. 2 the partial section of FIG. 1 with camera in action, FIG. 3 the partial section of FIG. 2, with a thrown back tarpaulin, FIG. 4 a partial section of the rear part of a truck with a rigid cargo container in accord with a second embodiment of the present invention, said truck being in normal operation, FIG. 5 the partial section of FIG. 4, with camera in action FIG. 6 a partial section of the rear part of a truck with a tarpaulin cargo container and a camera, in accord with a third embodiment of the present invention, said truck being in normal operation, FIG. 7 the partial section of FIG. 6 with a camera in action, and FIG. 8 the partial section of FIG. 7 with a thrown back tarpaulin.

It is noted that the rear cover 2a may comprise a flexible member such as a tarpaulin as shown in FIGS. 1-3, and 6-8 or a rigid member such as the rigid covering shown in FIGS. 4, 5.

FIG. 1 shows schematically the rear part or cargo container of a commercial vehicle or truck 1 with a cargo container 2 in the form of a tarpaulin frame. This tarpaulin framing encompasses a rear side comprising a rear tarpaulin 2a, which can be let down into a vertical position, as this is shown in FIG. 1. The rear tarpaulin can be thrown back, wholly or partially onto the roof of the cargo container for loading or unloading of the truck, as is shown in FIG. 3.

On the inside upper portion of the tarpaulin cargo container 2, within the cargo space and facing a rear tarpaulin, is mounted a camera 3, which is aligned in the longitudinal direction of the vehicle. Camera 3 is connected to a movement apparatus, which is fastened to the upper structure of cargo container 2 of vehicle 1. Facing the lens of the camera 3 and in the rear of the vehicle 1, the rear tarpaulin 2a is furnished with a movable flap 2b.

FIG. 1 shows the truck in normal operation, for instance, during normal forward travel. In this case, the rear tarpaulin 2a is shown extended downward in its vertical, closed position.

The camera 3, in this position of the rear tarpaulin 2a, is not active and is positioned by the movement apparatus 4 in an idle position entirely within the interior of the tarpaulin 2 enclosed cargo container. The camera 3 is further aligned in the vehicle's longitudinal direction and faces the rear tarpaulin 2a.

FIG. 2 shows the truck 1 with the camera 3 in its active position. Here the camera 3 is, for example, activated by the driver shifting into a reverse gear of the truck, so that, in the case of backing up, the camera is always activated. In a similar manner, the camera 3 could also be activated by the driver, for example, by the operation of a switch or the like.

If the camera 3 is activated, then it creates an image and transmits this to a (not shown) monitor in the driver's cab. Advantageously, it records an image in which a part of the vehicle is shown, or a part of a trailer, perhaps the rear bumper or the like, in order to provide the driver with a reference point in the exhibited image. Upon the activation of the camera 3, then the movement apparatus 4, carrying the camera 3, travels to the rear, in the longitudinal direction of the vehicle, into an activated position, as this is shown in FIG. 2. Simultaneously, with the movement of the camera 3, also the said rear flap 2b pivots outward about an axis A transverse to the longitudinal direction of the vehicle 1, thus swinging upward, so that the camera 3 now has a clear field of vision on the rear blind area of the truck.

The movement apparatus 4, for example, as is shown in FIG. 2, can also move the camera 3 forward and back in the longitudinal direction of the vehicle by means of a schematically indicated linear motor 4a. This motion would be either to the idle position or the active position. In the same way, the motion apparatus can also contain, in this application, a pivot or a rotation motor, which would, for example, could swivel the camera 3, for example, about an axis which is essentially normal to the longitudinal direction of the vehicle, as this will be described in a second and third mode of construction.

Tipping of the rear flap 2b, as is shown in FIGS. 1 and 2, can be effected by a mechanism which is connected with the camera 3 and/or the movement apparatus 4.

Tipping of the rear flap 2b, in other designs, can be downward in direction, to the side, or about a different axis. Likewise, the direction of tipping of the rear flap can also be so activated, that the camera 3, upon its movement into the active position, presses with its housing against the rear flap 2b. This, advantageously, avoids a complex mechanism for the pivoting of the said rear flap 2b.

In another (not shown) configuration, instead of the rear flap 2b, a slot in the rear tarpaulin cover 2a of the cargo compartment is substituted. Then the opening of the slot is brought about, by the camera 3, which upon moving into the active position separates the slot with the forepart of the camera housing. This advantageously avoids in like manner a complex mechanism for the pivoting of the rear flap 2b.

In a further embodiment (not shown) the movement apparatus 4 moves, by means of a mechanism 5, only the rear flap 2b, so that the camera 3 is provided with a clear line of sight on to the pertinent, rear area of the truck, without being moved itself.

FIG. 3 shows the truck 1 with the rear tarpaulin 2a thrown back, or up and over the container roof. Also, in this case, the camera 3 has a free field of vision of the pertinent rear area of the truck 1.

In the embodiment presented here, there exists between the mechanism 5 of the movement apparatus 4 for the opening of the rear flap 2b and the rear flap itself, a one sided contact. That is, upon running the camera 3 into the active position, the mechanism 5 pushes the rear flap open, while in the case of an over-thrown rear tarpaulin 2a, then no contact would exist between the mechanism 5 and the rear tarpaulin 2b.

Advantageously, the opening, that is, the rear flap or the slot, can be closed magnetically, so that it first, is easily opened by the movement apparatus 4, and second, with an inactive movement of apparatus 4 it can be self-closing, so that the infiltration of dirt, rain water, and the like is effectually prevented.

FIG. 4 shows a truck 1 in normal operation, for instance, in normal forward motion, with a second embodiment of the present invention. Contrary to the first embodiment presented above, here a truck with a cargo compartment having a rear side 2a which is rigid and a hinged rigid rear flap 2b which is pivotal about an axis A is shown. It is noted that flap 2b may comprise a rigid plate. The movement apparatus 4 includes, in this case, a rotating motor, which is operative to rotate the camera 3 about an axis which is parallel to said axis A. Otherwise, analogous elements are denoted by the same reference numbers as in the case of the first embodiment.

In FIG. 4, the camera 3 is facing the closed back side, is inactive, is positioned by the movement apparatus 4 to be entirely in the interior of the enclosed cargo compartment 2, and especially aligned in its idle position in the direction of the vehicle longitudinal direction.

Advantageously in this case, because of the mode of construction of the movement apparatus as a rotary motor, the opening height of the cargo container is scarcely diminished, since the camera 3 can be run into the inner roof of the cargo container.

FIG. 5 shows the truck 1 with an activated camera 3. The camera is, once again, activated by a shift into the reverse gear of the truck.

When the camera 3 is activated, it captures an image and transmits this to a (not shown) monitor in the cab of the driver. When the camera is in the active state, then the movement apparatus 4 rotates the camera 3 about an axis parallel to the axis A of the rear flap 2b into its active position as this is shown in FIG. 6. At the same time, by the motion of the camera 3, the rear flap 2b is also opened upward giving the camera a clear field of vision onto the pertinent rear area behind the truck.

In an (not shown) alternate mode of construction, instead of the area flap 2b, an elastic area with a slot is provided in the rear side 2a of the of the cargo container. In this case, the opening of the slot is so carried out, that the camera 3, upon being placed in the active position pushes the slot apart with the forward part of its housing. Advantageously, this avoids likewise a complicated mechanism for the pivoting of a rigid flap 2b.

In a (not shown) further embodiment of the present invention, the movement apparatus 4, working together with a mechanism 5, displaces only the back flap 2b, in such a manner that the camera has an unobstructed view of the pertinent area behind the truck, without moving the camera 3 itself FIG. 6 shows a truck 1 in normal operation, that is, in normal forward travel, with a third embodiment of the present invention. As in the case of the above presented embodiment, the matter here concerns a truck with a tarpaulin structured cargo container having a rear tarpaulin cover 2a. The movement apparatus 4 includes, as in the second embodiment, a rotating motor, which can rotate the camera 3 about an axis parallel to the said axis A. Otherwise, analogous elements are designated by the same reference numbers as in the case of the first or second embodiment.

In FIG. 6 the camera 3 is not active and is positioned by the movement apparatus entirely in the interior of the tarpaulin compartment 2.

FIG. 7 shows the truck 1 with an activated camera 3, which camera 3 is again energized by the shift into the reverse gear of the truck 1. FIG. 8 shows the truck 1 with an activated camera 3 where the rear tarpaulin 2a has been thrown back, i.e., thrown over the roof of said truck cargo compartment.

Contrary to the second embodiment, in this case the camera 3 is swung completely out of the interior of the tarpaulin structured cargo container, so that the blind area behind the truck is in the view of said camera. By this means, advantageously, the access height for loading is clearly increased, when the camera 3 is in the active state. For the increasing of the loading height, the camera 3, in a known manner, can be run-in or be collapsible, so that when it is in the inactive state, the loading clearance of the tarpaulin constructed cargo container has the greatest possible clearance.

What is claimed is:

1. A camera assembly for use with a commercial vehicle having an upstanding cargo container having an open rear comprising:
    movement apparatus, secured with an upper rear area of said cargo container, mounting a camera within said upper rear area of said cargo container;
    a closure, having a hinged flap, secured with said rear of said cargo container, said flap being movable between open and closed positions; wherein,
    said movement apparatus is operative upon actuation to move said camera from inside to outside said cargo container, said camera during said movement being operative to engage and pivot said hinged flap forming an opening through said closure positioning said camera positioned to capture a defined field of vision to include a rear portion of said commercial vehicle and an area adjacent thereto.

2. A camera assembly for use with a cargo container of a commercial vehicle comprising:
    movement apparatus, secured with an upper rear area of said cargo container, mounting a camera within said cargo container;
    a closure secured with a rear area of said cargo container to normally extend in a generally vertical position, said closure having a normally closed opening in an upper area generally axially aligned with said movement apparatus and said camera; wherein,
    actuation of said movement apparatus moves said camera through said opening and out of said cargo container into a position to capture a defined field of vision in a rear area behind and adjacent said commercial vehicle.

3. The assembly according to claim 1 wherein said movement apparatus has a rotary drive and moves said camera along an arcuate path radially spaced from its axis of rotation.

4. An assembly in accord with claim 2, wherein the movement apparatus has a linear drive.

5. An assembly in accord with claim 2, wherein the movement apparatus has a rotary drive.

6. An assembly in accord with claim 2, wherein the movement apparatus is energized by means of a shifting of the commercial vehicle into a reverse gear.

7. An assembly in accord with claim 2, wherein the movement apparatus can be manually energized and deenergized by a driver of the commercial vehicle.

8. An assembly according to claim 1 wherein said closure is rigid.

9. An assembly according to claim 1 wherein the closure comprises a tarpaulin.

10. An assembly according to claim 1 wherein said closure is rotatable about an axis which is essentially normal to the longitudinal axis of the commercial vehicle.

11. The assembly according to claim 1 wherein said closure is self closing.

* * * * *